United States Patent Office 3,816,501
Patented June 11, 1974

3,816,501
CYCLOPROPANEMETHYLTHIOL DIESTER OF TEREPHTHALIC ACID
Clive A. Henrick and Gerardus B. Staal, Palo Alto, Calif., assignors to Zoecon Corporation, Palo Alto, Calif.
No Drawing. Filed Sept. 18, 1972, Ser. No. 289,897
Int. Cl. C07c 153/07
U.S. Cl. 260—455 R        1 Claim

ABSTRACT OF THE DISCLOSURE

The compound

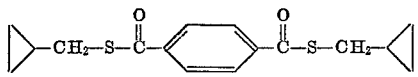

synthesis thereof, and compositions thereof, for the control of mites.

---

This invention relates to novel compounds, synthesis thereof, compositions thereof and the control of mites.

The compounds of the present invention are very effective for the control of mites. Mites are plant feeders and cause serious damage to orchard trees, field crops, greenhouse plants and other vegetation. They feed on the foliage or fruit of plants and trees and attack a variety of plants and trees due to their wide distribution. Mites of the family Tetranychidae, such as *Tetranychus urticae, Tetranychus atlanticus, Tetranychus bioculatus, Tetranychus canadensis, Tetranychus cinnabarinus, Tetranychus pacificus* and similar related species, are of particular biological interest and economic importance.

Compounds of the present invention of the following formula A are effective control agents for mites.

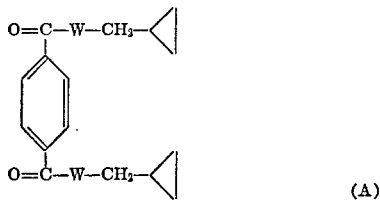

wherein W is —O—, —S— or —NH—.

They are preferably applied to the immature mite, namely, during the embryo, larvae or nymphal stages in view of their effect on metamorphosis and otherwise causing abnormal development leading to death, to inability to pass from one stage to the next, or to the inability to reproduce. A compound of formula A, or mixtures thereof, can be applied at low dosage levels of the order of 0.001% to 1%. Suitable carrier substances include liquid or solid inert carriers, such as water, acetone, xylene, mineral or vegetable oils, talc, vermiculite, and silica. Treatment of mites in accordance with the present invention can be accomplished by spraying, dusting, or otherwise contacting the mites and/or their eggs or larvae directly or indirectly. Generally, a concentration of less than 25% of active compound is employed, although a higher concentration of the active compound can be used depending on the type of application and effectiveness of the active ingredient.

The carboxylic ester of formula A (W is —O—) are prepared by the reaction of an acid halide, such as terephthalic acid chloride, with cyclopropanemethyl alcohol neat or in an organic solvent inert to the reaction, such as a hydrocarbon or ether solvent. Usually an excess of said alcohol is employed and the reaction proceeds at room temperature satisfactorily, although higher or lower temperatures may be used. The reaction can be conducted in the presence of pyridine.

The thiolester of formula A (W is —S—) can be prepared by the reaction of a terephthalic acid halide with cyclopropanemethyl mercaptan in an organic solvent inert to the reaction. Pyridine can be added, if desired.

The amide of formula A (W is —NH—) can be prepared by the reaction of cyclopropylmethylamine with a terephthalic acid halide in an organic solvent inert to the reaction such as a hydrocarbon.

The mite control agents of the present invention can be used alone in an inert carrier substance for the control of mites (Arachnids) or can be used in mixture with pesticides and/or juvenile hormone analogs known in the art in order to obtain a broader spectrum of activity. Suitable insecticides include Baygon, Captan, Sevin, Ciodrin, Systox, Diazinon, Vapona, Cygon, Dimethrin, Dursban, Malathion, and Parathion. Typical juvenile hormone analogs which can be used in mixture with the compounds of formula A of the present invention are described in Belgian Pats. 778,214, 778,241 and 778,242.

The following examples are provided to illustrate the syntheses of the compounds of the present invention and the practice of the present invention. Temperature in degrees centigrade.

EXAMPLE 1

To a mixture of 43.3 g. of cyclopropanemethanol and 200 ml. of dry ether, under nitrogen, is slowly added a mixture of 57.8 g. of terephthalyl chloride and 150 ml. of dry ether. The reaction mixture is stirred overnight at room temperature under nitrogen, then the reaction mixture is heated to reflux for about one hour. Heat is removed and then 36 ml. of pyridine is added slowly with stirring. After about 2.5 hours, the reaction is worked up by adding about 500 ml. of water and shaking and then ether solution is washed with saturated sodium bicarbonate solution, water and brine, dried over magnesium sulfate and filtered. The filtrate is concentrated, recrystallized in methanol, filtered, washed with cold methanol and dried to yield the cyclopropanemethyl ester of terephthalic acid, white crystals, of formula A (W is —O—).

EXAMPLE 2

To a mixture of 2 g. of terephthalyl chloride and 30 ml. of dry ether, under nitrogen, is added 4.27 g. of cyclopropanemethyl alcohol. The reaction mixture is allowed to stand at room temperature, with stirring, for three days. The reaction is poured into water and extracted with benzene. The organic phase is washed with saturated sodium bicarbonate solution, water and brine, dried over calcium sulfate and solvent removed to give crystalline cyclopropanemethyl ester of terephthalic acid of formula A, which can be further purified by recrystallization using ether-hexane.

EXAMPLE 3

A mixture of 0.01 mole of terephthalic acid chloride, 0.06 mole of cyclopropanemethyl mercaptan and dry benzene is stirred at room temperature for about 48 hours, under nitrogen. Ether and saturated sodium bicarbonate is added and the organic phase separated. The organic phase is washed with aqueous sodium bicarbonate, and brine, dried over calcium sulfate and solvent evaporated to yield the cyclopropanemethylthiol ester of formula A (W is —S—).

To 135 g. (1 mole) of cyclopropanemethyl bromide is added a solution of 80 g. of thiourea in 50 ml. of water and 100 ml. of ethanol. The reaction mixture is stirred and refluxed for about two hours. Then a solution of 60 g. of sodium hydroxide in 500 ml. of water is added and the mixture refluxed for about two hours. The reaction mixture is then concentrated under reduced pressure to remove most of the solvent. The concentrate is acidified by careful addition of ice cold hydrochloric acid and then extracted with ether. The ethereal extract is washed with water, dried over calcium sulfate and ether removed to yield cyclopropanemethyl mercaptan, which can be purified by distillation under water pump vacuum.

EXAMPLE 4

A mixture of 0.01 mole of terephthalic acid chloride in dry benzene is mixed with 0.04 mole of cyclopropanemethyl amine in dry benzene. The mixture is stirred and then allowed to stand at room temperature until starting material substantially disappears as followed by thin-layer chromatography. Then the mixture is concentrated under reduced pressure and the concentrate taken up in fresh benzene, washed with dilute aqueous sodium bicarbonate and water, dried over sodium sulfate and solvent evaporated to yield the amide of formula A (W is —NH—).

Adults (*Tetranychus urticae*) were allowed to oviposit for 24 hours on the upperside of lima bean leaf discs (1 cm.) on moist cotton wool. After 24 hours, the adults were removed and the leaf discs were then dipped in acetone solutions of the ester of formula A (W is —O—) at concentration of 0.001%, 0.01%, and 0.1%. The control discs were sipped in acetone only. After submersion for about one second, the solvent on the leaf discs is allowed to dry and the leaf discs are then glued to a plastic petri dish to prevent crumpling. Five days later, the number of unhatched eggs is calculated as a percentage of the total number originally present. Percent of non-emergence was 8% for control, 9% for 0.001% concentration, 75% for 0.01% concentration and 100% for 0.1% concentration.

Adults (*Tetranychus urticae*) were allowed to oviposit on bean leaves in the confinement of 1.5 cm. circles of tanglefoot glue (mite barrier). Adults were removed after 24 hours. All eggs hatched after six days after removal of the adults. Then the leaves were sprayed, until run-off, with the ester of formula A (W is —O—) diluted in 0.1% Tween 20 in water. The mortality was evaluated 72 hours after spraying. $ID_{50}$ of 0.002% was obtained.

What is claimed is:

1. The compound,

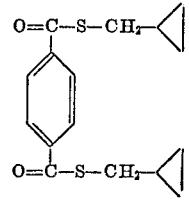

References Cited

FOREIGN PATENTS

| | | | |
|---|---|---|---|
| 1,911,520 | 9/1969 | Germany | 260—455 R |
| 819,688 | 9/1959 | Great Britain | 260—455 R |

LEWIS GOTTS, Primary Examiner

D. R. PHILLIPS, Assistant Examiner

U.S. Cl. X.R.

260—475 R, 558 R; 424—301, 308, 324